United States Patent [19]

Joy

[11] Patent Number: 5,759,217
[45] Date of Patent: Jun. 2, 1998

[54] FILTER ASSEMBLY FOR A FLUID COMPRESSOR

[75] Inventor: Anthony W. Joy, Cornelius, N.C.

[73] Assignee: Ingersoll-Rand Company, Woodcliff Lake, N.J.

[21] Appl. No.: 781,402

[22] Filed: Jan. 10, 1997

[51] Int. Cl.$^6$ .......................... B01D 27/08; B01D 29/07; B01D 35/30

[52] U.S. Cl. .......................... 55/320; 55/385.1; 55/472; 55/497; 55/502; 55/504

[58] Field of Search .......................... 55/490, 492, 493, 55/494, 495, 497, 502, 503, 504, 506, 507, 508, 510, 511, 513, 418, 467, 469, DIG. 17, 320, 325, 332, 385.1, 385.7, 472, 383

[56] References Cited

U.S. PATENT DOCUMENTS

| | | | |
|---|---|---|---|
| 4,056,376 | 11/1977 | Schuldenfrei | 55/497 |
| 4,174,204 | 11/1979 | Chase | 55/302 |
| 4,308,041 | 12/1981 | Ellis et al. | 55/510 |
| 4,311,439 | 1/1982 | Stofen | 55/385.1 |
| 4,636,230 | 1/1987 | Fan | 55/385.1 |
| 4,657,570 | 4/1987 | Gronholz et al. | 55/510 |
| 4,874,513 | 10/1989 | Chakraborty et al. | 55/503 |
| 4,997,466 | 3/1991 | Hood | |
| 5,167,683 | 12/1992 | Behrendt et al. | 55/502 |
| 5,222,488 | 6/1993 | Forsgen | 55/502 |
| 5,509,950 | 4/1996 | Graaf et al. | 55/502 |
| 5,569,311 | 10/1996 | Oda et al. | 55/503 |

OTHER PUBLICATIONS

Type-30 Electric and Gasoline Drive Two Stage Industrial Air Compressor, Parts List, Model 2540, Ingersoll-Rand, Aug. 1990, p. 6.

Type-30 Two-Stage Industrial Air Compressor, Parts List, Model 3000, Ingersoll-Rand, Jul. 1990, p. 3.

Type-30 High-Pressure Air Compressor, Instruction Manual, Model 6R80 & 6R80-100 Ingersoll-Rand, Jun. 1990, p. 17.

*Primary Examiner*—C. Scott Bushey
*Attorney, Agent, or Firm*—Michael M. Gnibus

[57] ABSTRACT

A filter assembly for a fluid compressor, the filter assembly including a first filter housing having a sealing boundary and a fluid inlet; a filter element supported on the sealing boundary, the filter element having a filter media made integral with a first side seal member, a second side seal member, and a bottom seal; a second filter housing seated on the filter element, the second filter housing having a filter loading member for loading the side seal members to cause the bottom seal to sealingly engage the sealing boundary; and clamp members for maintaining loading on the side seal members.

15 Claims, 7 Drawing Sheets

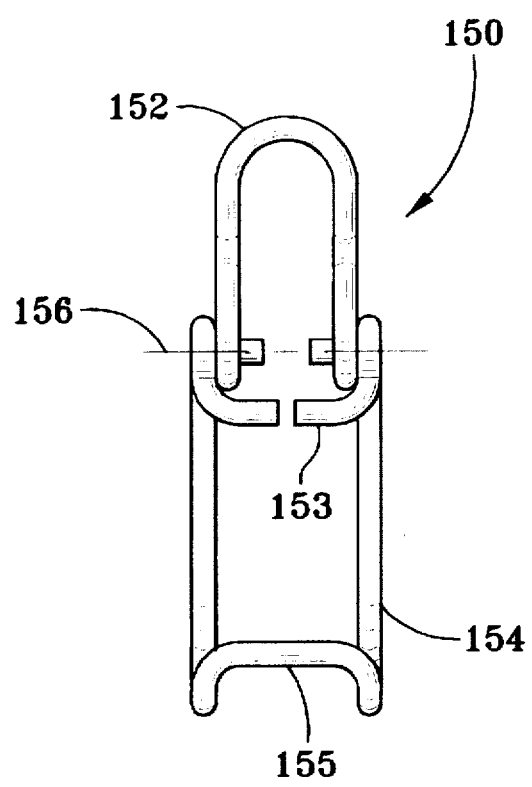
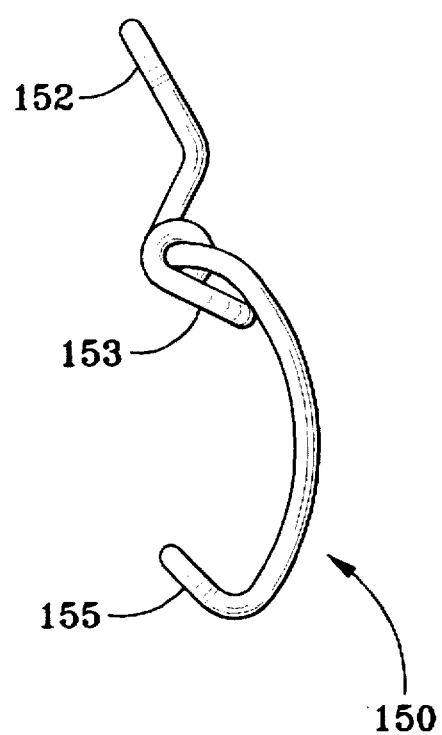
FIG. 8
FIG. 9

FILTER ASSEMBLY FOR A FLUID COMPRESSOR

BACKGROUND OF THE INVENTION

The invention relates to a filter assembly; and more particularly to a filter assembly for a fluid compressor where the filter assembly includes a bottom filter housing, a top filter housing, and a filter element having side seal members, wherein the side seal members are loaded by the top filter housing.

In typical fluid compressors, a fluid such as ambient air is drawn into the compressor through a compressor inlet and is passed through a filter before being compressed. The filter serves to remove undesirable particulate matter entrained in the fluid. In this way, the undesirable particulate matter will not negatively affect the compressibility of the fluid or the efficiency or operation of the compressor.

Typical filter assemblies for fluid compressors include a hollow cylindrical housing having an open end, a cylindrical filter member located in the housing, and a lid for closing the open housing end. The housing is welded or otherwise flow connected to a standard inlet conduit or pipe. The fluid is flowed to the compressor through the inlet pipe. The most significant shortcoming associated with conventional compressor air filter assembly designs is that they limit the flow rate of the volume of ambient air that may be flowed through the filter and supplied to the compressor. Since conventional filter assemblies are flow connected to conventional inlet pipes, the flow rate of the volume of air that may be supplied to the compressor is limited by the cross-sectional area of the conventional inlet pipe.

Filter assemblies for use in applications not related to fluid compressors also have shortcomings. Filter assemblies for such other applications such as automotive applications generally include a housing base, a cover, and a filter element having a filter base and a filter media made integral with the filter base. When assembled, the filter base is located on the housing base and the cover tightened onto the filter base by conventional means such as bolts for example. As a result, the filter base sealingly engages the filter housing base and the passage of unfiltered inlet fluid directly into the compressor is prevented.

Although this conventional arrangement effectively produces the required seal between the filter and housing bases, in order to achieve an effective seal it is necessary to reduce the cross-sectional area of a flow opening in the base supporting the filter medium. In order to load the filter base to produce the required seal, there must be sufficient area along the base to bolt or otherwise tighten the top filter housing onto the base. By limiting the cross-sectional area of a flow opening in the base supporting the filter medium, the flow rate of the volume of fluid that may be flowed into an object of interest is similarly reduced.

The foregoing illustrates limitations known to exist in present filter assemblies. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a filter assembly for a fluid compressor comprising a first filter housing having a sealing boundary and a fluid inlet; a filter cartridge adapted to be supported on the sealing boundary, the filter cartridge having a filter media made integral with a first side seal member, a second side seal member, and a bottom seal; a second filter housing adapted to be seated on the filter cartridge, the second filter housing having a filter loading means for loading the first and second side seal members to cause the bottom seal to sealingly engage the sealing boundary; and clamp members for maintaining loading on the side seal members.

The foregoing and other aspects will become apparent from the following detailed description of the invention when considered in conjunction with the accompanying drawing figures.

DESCRIPTION OF THE DRAWING FIGURES

FIG. 8 is a rear view of a filter assembly clip; and

FIG. 9 is a side view of the filter assembly clip of FIG. 8.

DESCRIPTION OF THE PREFERRED EMBODIMENT

Figure 1:
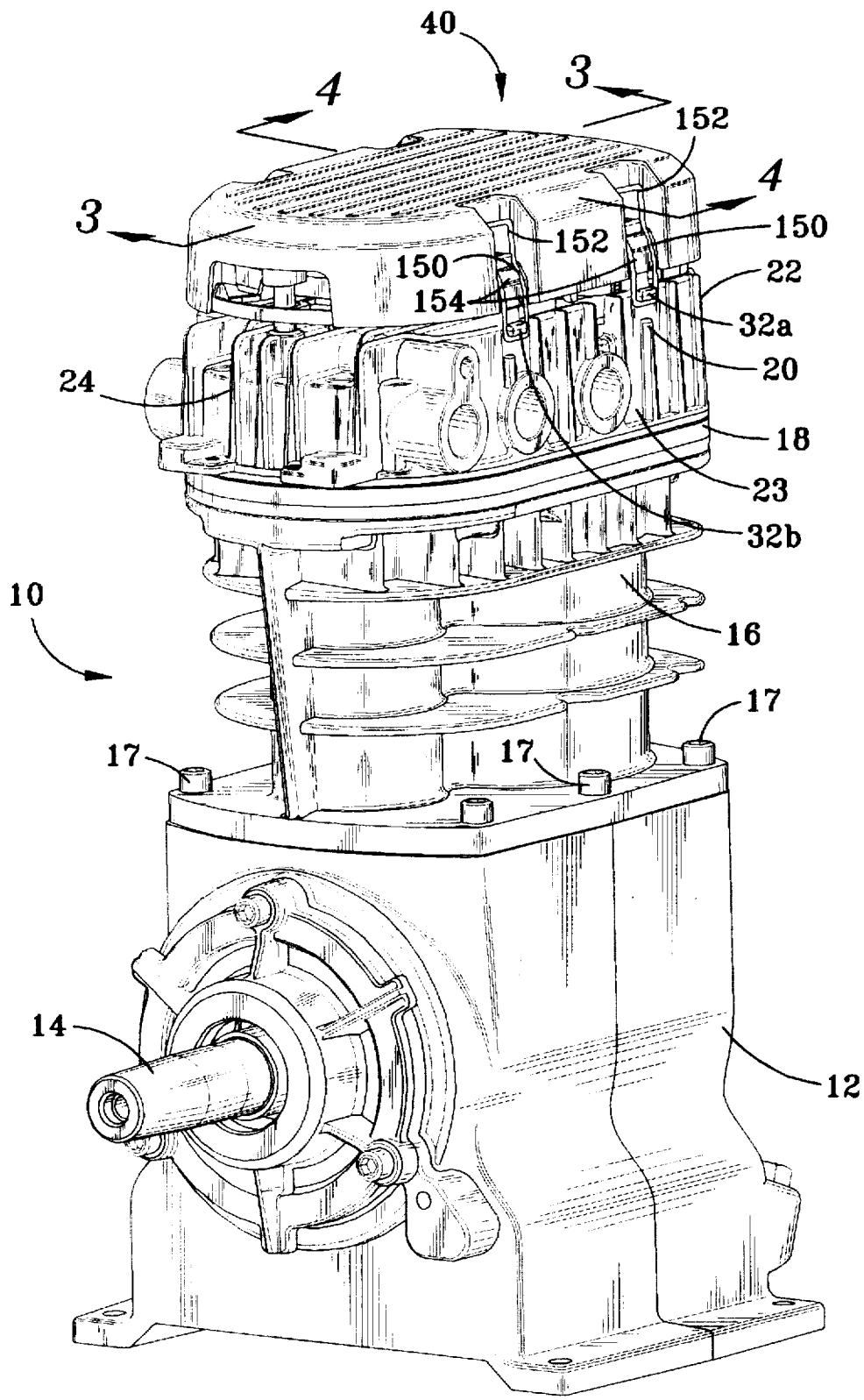
FIG. 1 is an isometric view of a fluid compressor that includes the filter assembly of the present invention.

Turning now to the drawings wherein like parts are referred to by the same number throughout the several views, FIG. 1 is an isometric view of fluid compressor 10 that includes filter assembly 40 of the present invention. For purposes of describing the preferred embodiment of the invention, the compressor 10 is a reciprocating, piston-type compressor well known to one skilled in the art. However it should be understood that compressor 10 may be any fluid compressor that is adapted for use with filter assembly 40.

Generally, compressor 10 includes a frame 12 which substantially encloses a crankshaft 14 and piston connecting rods (not shown) for driving the piston members (also not shown) in a conventional manner through cylinder 16. As shown in FIG. 1, the cylinder is attached to the frame by conventional fasteners 17. A valve plate 18 is sandwiched between the top of cylinder 16 and the compressor head 20.

The compressor head 20 includes a front end 22, a rear end 24, first and second sidewalls 23 and 25 extending between the ends, and a compressor fluid inlet 26 that extends through the head, adjacent the front end. See FIG. 2. Filter assembly locator members 28a and 28b are respectively located proximate the front and rear ends of the compressor head. Each of the locator members has a free end that is located above the head and the members 28a and 28b are tapered outwardly from the free end. The tapered locator members function to permit the filter assembly to be seated in the precise required location on the chamber head. Additionally, the tapered members 28a and 28b keep the filter assembly 40 seated down on the compressor head.

Figure 2:
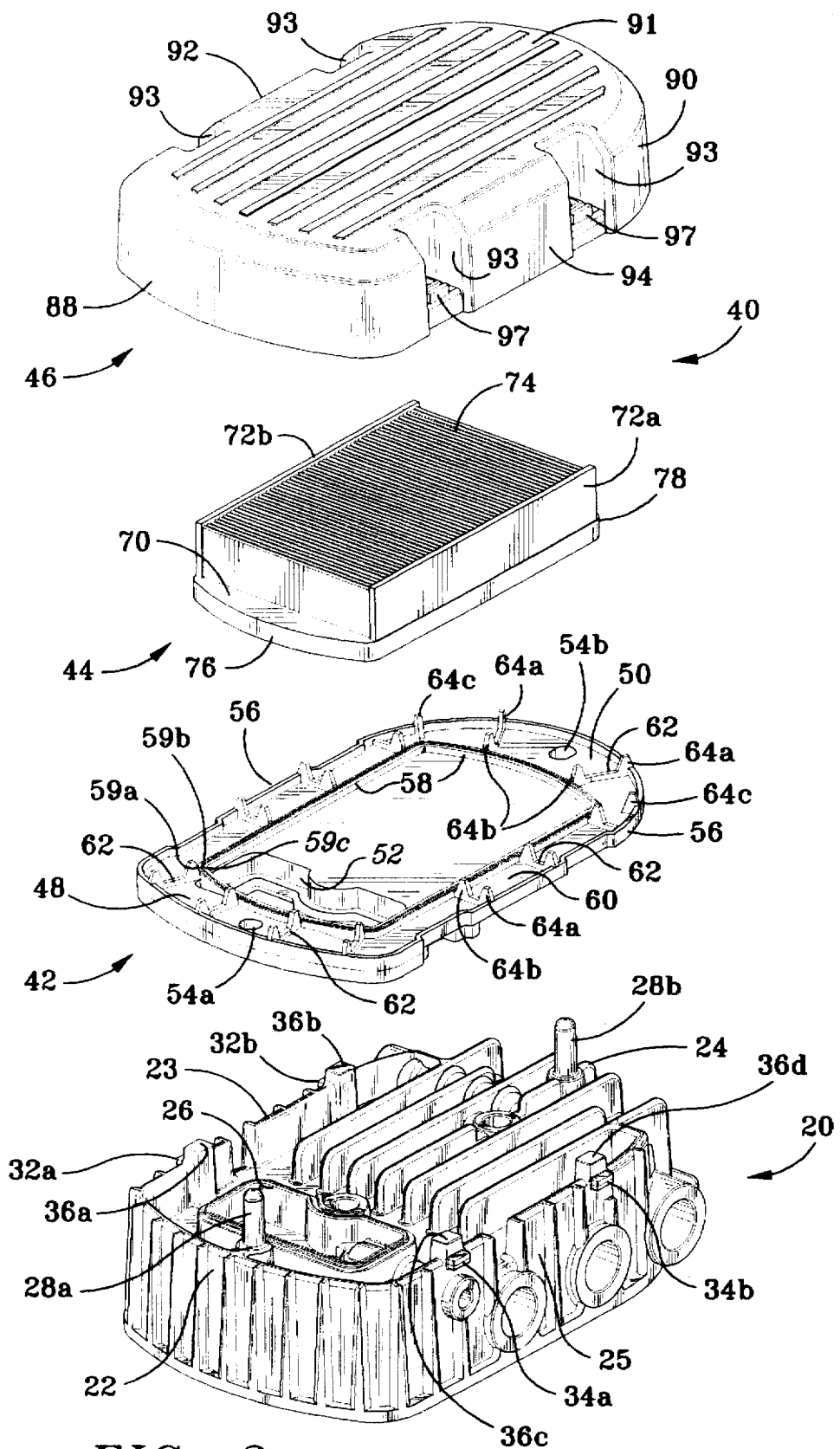
FIG. 2 is an isometric view of an exploded assembly of the filter assembly shown in FIG. 1.

Tabs 32a, 32b, 34a, and 34b are provided along the exterior of head sidewalls 23 and 25. See FIG. 2. When the filter assembly 40 is seated on the head, the assembly is seated on filter assembly supports 36a, 36b, 36c, and 36d provided along the first and second sidewalls 23 and 25. As shown in FIG. 2, the tops of the assembly supports extend above the top edges of the sidewalls.

It should be understood that the terms "front", "rear", "top", and "bottom", as used herein are included only for orientation and reference purposes so as to clearly describe the preferred embodiment, and are not intended to in any way limit the scope of the present invention.

Now turning to the filter assembly of the present invention. The filter assembly 40 is comprised of a bottom filter housing 42, a filter element 44, and a top filter housing 46. An exploded isometric view of the filter assembly is provided in FIG. 2 and longitudinal and lateral sectional views of the assembly are provided in FIGS. 3 and 4 respectively.

Figure 3:
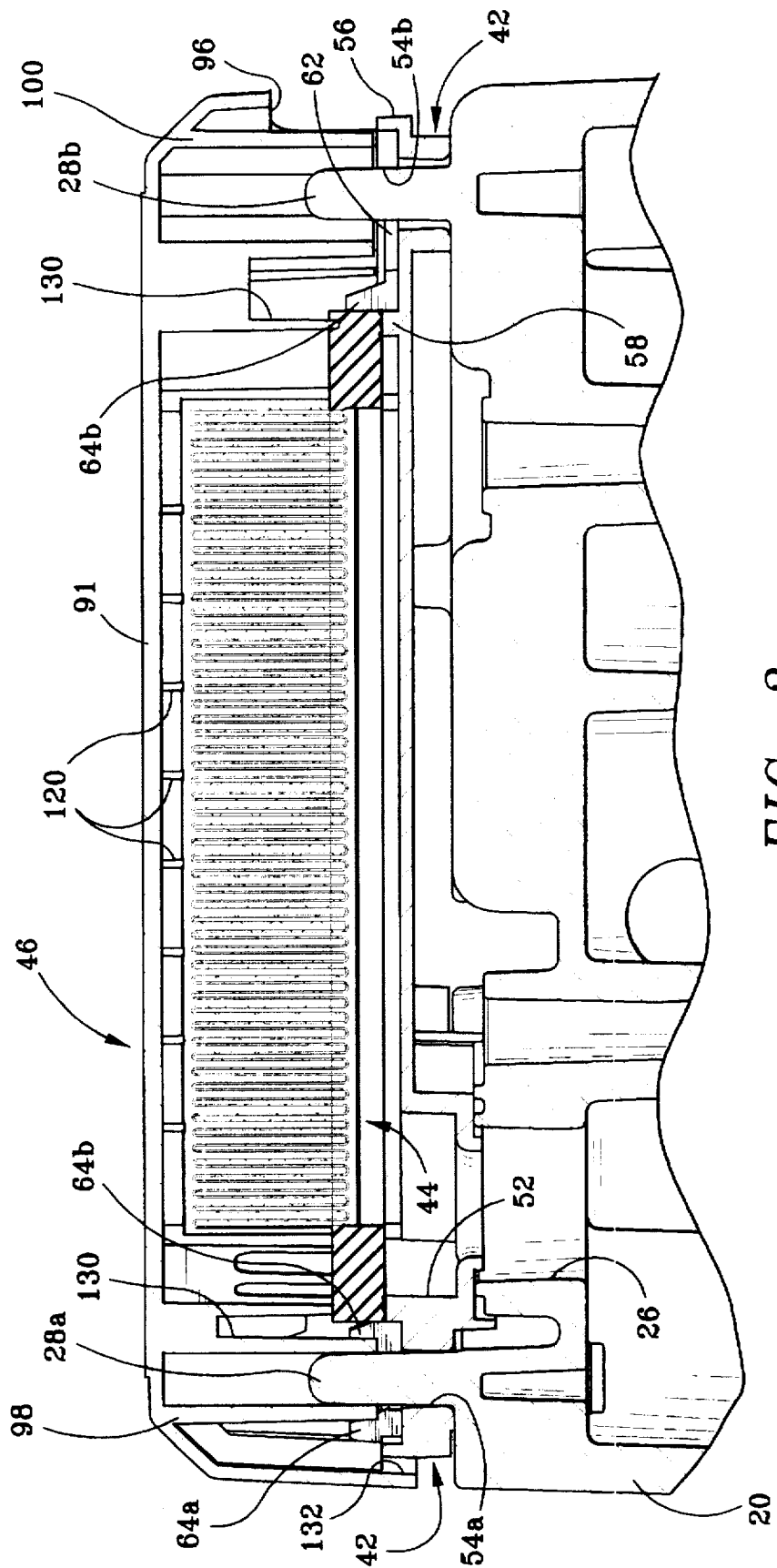
FIG. 3 is a longitudinal sectional view of the filter assembly taken along line 3—3 in FIG. 1.

The bottom filter housing 42 is seated on the compressor head 20 and forms a seal with the filter element 44 when the filter assembly 40 is mounted for use on the compressor 10. The housing 42 is substantially planar and includes a front end 48, a rear end 50, an inlet opening 52 which overlies the compressor fluid opening 26. As shown in FIG. 2, the front and rear ends are arcuate. Locating apertures 54a and 54b are provided in front and rear ends 48 and 50 and are adapted to receive locating members 28a and 28b. This is shown in FIG. 3.

An endless channel 60 is defined by outer periphery 56 and endless sealing boundary 58 of bottom housing 42. A plurality of discrete rib members 62 extend across the channel and the rib ends join the outer periphery 56 and sealing boundary 58. The ribs are spaced along the channel and serve to strengthen the housing 42. Each of the ribs includes at least one positioning tab 64 made integral with an associated rib at one of the rib ends. As shown in FIG. 2, each tab 64 is substantially triangular. In the drawings, positioning tabs located immediately proximate the outer periphery 56 are identified as 64a and positioning tabs located immediately proximate the sealing boundary are identified as 64b. Many of the ribs include a positioning tab at both rib ends. Positioning tabs referred to as 64c, are not associated with a rib. In the preferred embodiment, the positioning tabs 64c are located at the rear end 50 along the outer periphery 56. The tabs 64a engage the first and second walls, front and rear of the top housing 46 and guide the top housing around the bottom housing 42 when the top housing is placed onto the bottom housing. The positioning tabs 64b engage the bottom seal 70 of filter element 44 and guide the filter element onto the top of the sealing boundary 58.

Figure 6:
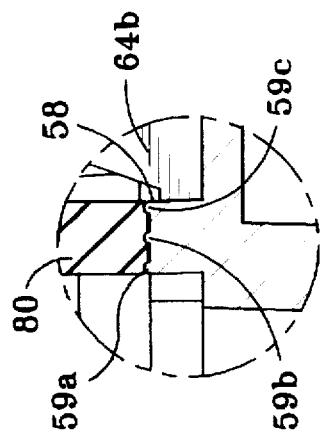
FIG. 6 is an enlarged partial view of the filter assembly shown in FIG. 4.

Referring to the enlarged partial view of FIG. 6, three endless sealing ridges 59a, 59b, and 59c having semicircular cross-sections, are spaced along the top of the sealing boundary 58. The ridges produce a seal with bottom seal 70 of filter 44 that is believed to be more effective than conventional surface to surface seals. When the filter element is loaded by the top housing 46, the bottom seal is forced into sealing engagement with the ridges and because the bottom seal is made from a resilient material, the bottom seal 70 substantially fills the spaces between adjacent ridges in the manner shown in FIG. 6.

Filter element 44 is a panel filter comprised of a bottom seal 70, a pair of longitudinally oriented side seals 72a and 72b and a filter media 74 that extends between the side seals. The filter media is made integral with the side seals and bottom seal during a conventional molding process well known to one skilled in the art. As shown most clearly in FIG. 5, the bottom seal 70 includes arcuate front and rear portions 76 and 78 and first and second sides 80 and 82. The first and second sides and front and rear portions define opening 84 through which the filtered, ambient air passes out of the filter to inlets 52 and 26. A conventional screen or mesh 83 is located in the opening 84.

The filter media is made from a conventional paper-based material and is arranged in a plurality of side-by-side pleats with the ends of the pleats being molded or otherwise made integral with the side seals. The bottoms of the pleats are made integral with the bottom seal.

Figure 4:
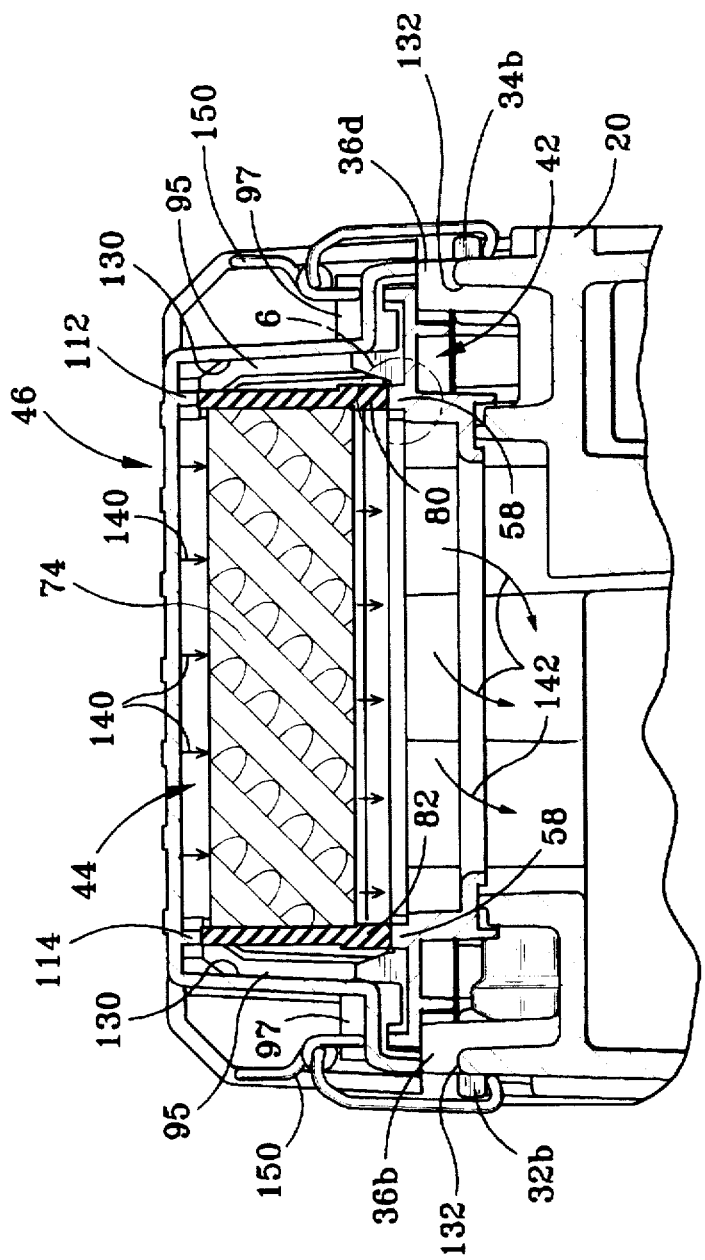
FIG. 4 is a lateral sectional view of the filter assembly taken along line 4—4 in FIG. 1.
Figure 5:
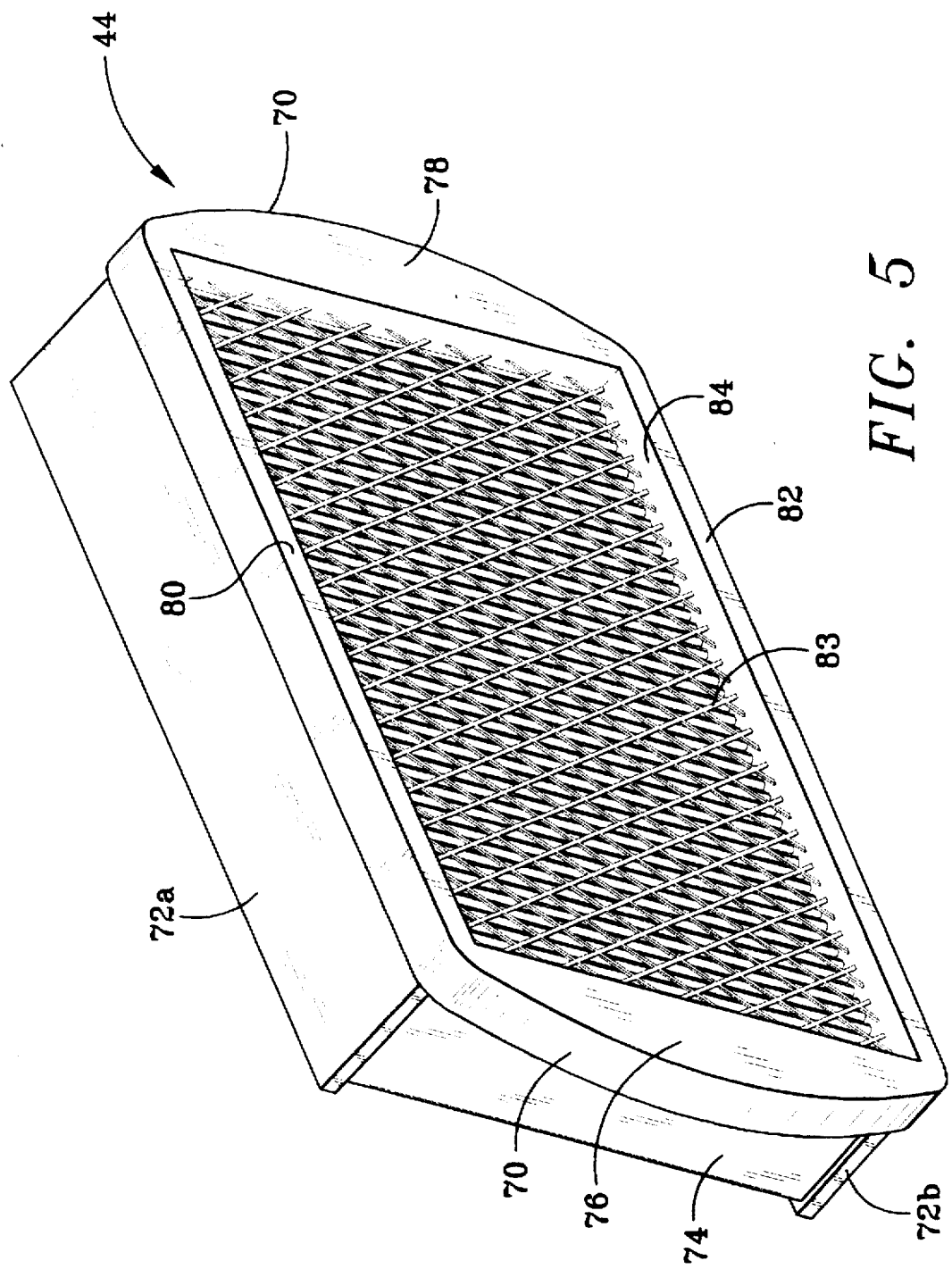
FIG. 5 is an isometric view of the bottom of the filter element of FIG. 2.

The filter media may also be made from polyester or another suitable material. As shown in FIGS. 2 and 5, the side seals are located proximate the outer periphery of side 80 and 82 and in this way, the area defined by the filter media is maximized. As shown in FIGS. 3 and 4, the bottoms of sides 80 and 82 and rear and front 78 and 76, form a seal with the ridges 59a, 59b, and 59c of sealing boundary 58 in the manner previously described. The bottom seal and side seals are made from a suitable resilient material such as a rubber-based material for example.

Filter assembly top housing 46 has a front 88, rear 90, top 91, and first and second sides 92 and 94. The top, rear, front and first and second sides define a housing chamber 95. A pair of recesses 93 are provided along walls 92 and 94 and are adapted to receive a clip member 150 which maintains the filter assembly as a unit on the compressor 10 and keeps the top housing loaded against the filter element side seals. The clip 150 and side seal loading will be described in greater detail hereinafter. A slotted base 97 is located along the floor of each recess. See FIG. 4.

A fluid inlet 96 is provided along the rear portion 90 of the top housing, and uncompressed fluid enters the filter assembly primarily through the inlet 96. Bosses 98 and 100 are located in housing chamber adjacent front and rear portions respectively. The bosses removably receive the free ends of locator members 28a and 28b as shown in FIG. 3.

Filter element loading means 110 is made integral with top 91 and extends into chamber 95 of housing 46. The loading means is comprised of longitudinally extending side seal loading means 112 and 114, laterally extending bottom seal loading means 116 and 118 which join the side seal loading means to thereby form endless loading means 110.

When filter 40 is assembled, the top housing is located on the filter element and the side seal loading means is seated on the tops of the side seals 72a and 72b as shown in FIG. 4, and front and back loading means is located on the tops of front and back 76 and 78 of the bottom seal 70 as shown in FIG. 3. In this way, the top housing serves to load or force down the filter element to produce the required seal between the bottom seal 70 and the sealing boundary 58.

Figure 7:
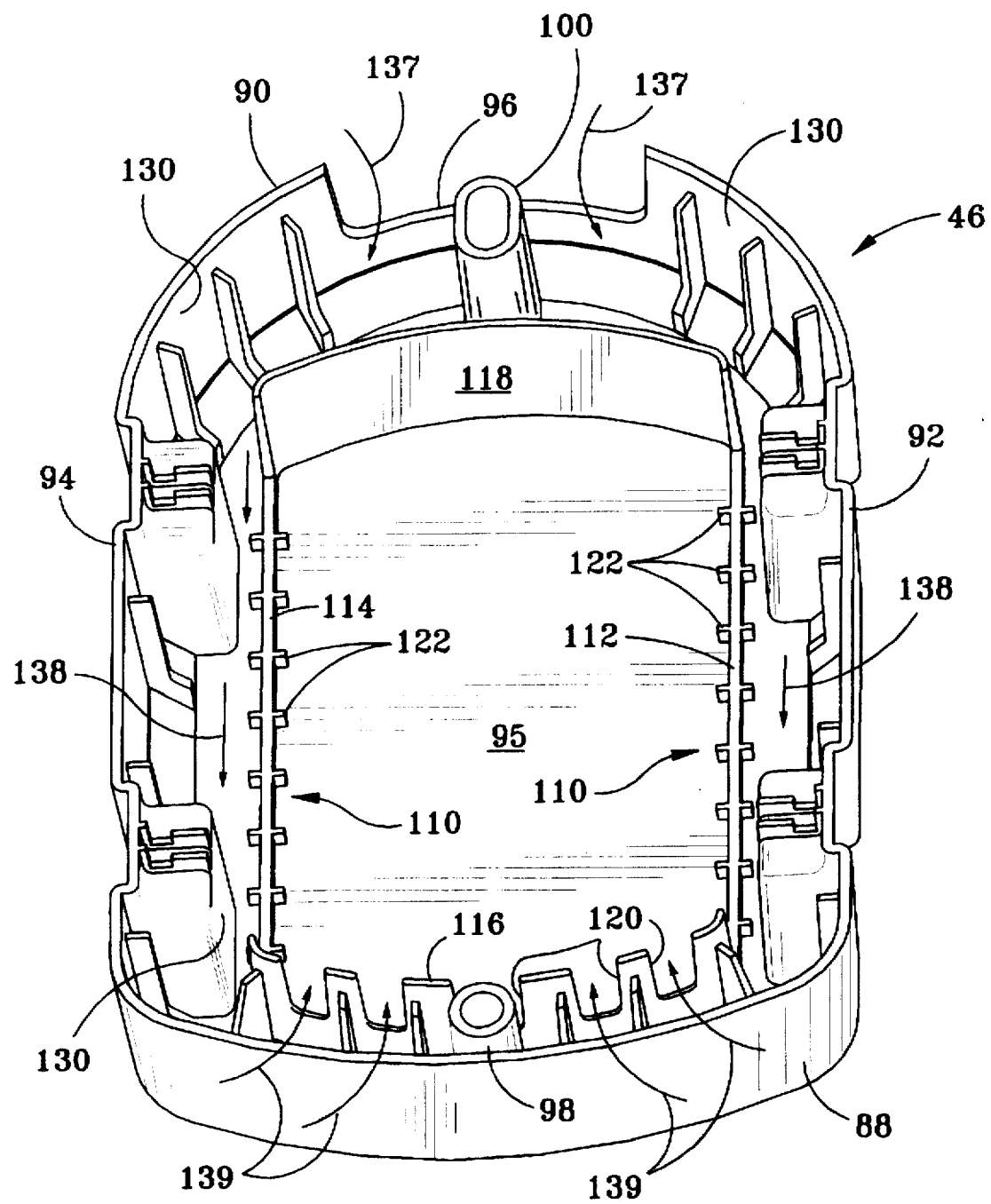
FIG. 7 is an isometric view showing the bottom of the top filter housing of FIG. 1.

As shown in FIG. 7, the bottom seal loading means 118 includes a plurality of scallops 120 that permit ambient air that enters the filter housing 46 through the inlet 96 to flow through the filter media 74.

Each side seal loading means 112, 114 includes a plurality of fingers 122 which are oriented perpendicular to the respective side seal loading means. The fingers produce more effective loading of the filter element side seals.

It is contemplated that scallops like scallops 120 may be provided in bottom seal loading means 118. Ambient air could flow through the filter through the proposed additional scallops. It is also contemplated that voids may be provided in the side seal loading means to permit ambient air to flow therethrough to the filter media.

Referring to FIGS. 8 and 9, fastening means 150 are located in recesses 93 and maintains assembly 40 as a single unit and also keep the side seals 72a and 72b loaded by the loading means 112 and 114. The fastening means are preferably lever type over center clips made from a rigid wire although any suitable material may be used. The preferred fastening means includes two portions that are hooked together, a lever portion 152 and anchor portion 154 both rotatable independent of the other portion about axis 156. The lever includes a prong 153 that is adapted to be located in slotted base 97, and anchor portion 154 includes a hook end 155 that is hooked under tabs 32a,b and 34a,b.

Operation of filter assembly 40 will now be described. Ambient air is drawn into the top filter housing 46 through inlet 96. The air enters an endless primary flow passage defined along the rear between the top housing rear portion 90, bottom seal rear 78 and loading means 118; along the first side by top housing wall 92, side seal loading means 112, side seal 72b; along the second side by top housing wall 94, side seal loading means 114, and side seal 72a; and along the front by loading means 116, top housing front 88 and bottom seal front 76. The top and bottom of the passage is defined by the housing top 91 and along the bottom by the bottom housing 42. The uncompressed ambient air flows through the primary passage around the filter element 44, in the direction identified by arrows 137 and 138 in FIG. 7. The air continues toward the front 88 through the scallops 120, as shown by arrows 139, above the filter media 74 and through the media as indicated by arrows 140. The air is filtered as it passes through the media 74. The filtered air then flows into the compression chamber through inlets 52 and 26 as indicated by arrows 142. It should be understood that in FIG. 7, in order to clearly shown the flow path of the ambient air through primary passage 130, the bottom housing 42 and filter 44 which partially define the primary passage 130 are not shown.

An endless secondary ambient air passage 132 is defined between the outer periphery 56 of the bottom housing 42 and the interior of walls 88, 90, 92, and 94 of top housing 46. See FIG. 3. During operation of compressor 10, ambient air is also drawn through the secondary passage and into the primary passage and is entrained in the stream of air drawn through inlet 96 and is flowed through filter top housing 46 in the manner previously described hereinabove.

Assembly of the filter assembly 40 will now be described. After the frame 12, cylinder 16, valve plate 18, and compressor head 20 have been assembled (including all internal compressor components not shown), the filter assembly is then assembled on the head 20. Bottom housing 42 is located on the top of the head 20. As the bottom is located down onto the head, the locator members 28b and 28a are inserted in apertures 54a and 54b. In this way, the bottom housing is located precisely in the required position on the head and the housing inlet 52 is in fluid conveying alignment with the head inlet 26.

The filter element 44 is then seated on the sealing ridges 59a, 59b, and 59c of sealing boundary 58. The positioning tabs engage the outer periphery of filter element bottom seal 70 and guide the filter element onto the required position on top of the sealing boundary.

Then, the top housing 46 is placed onto the filter element with the side seal loading means 112, and 114 located on top of side seals 72a and 72b; and front and rear loading means located on bottom seal 70. The interior portions of sidewalls 92 and 94 and front and rear walls 88 and 90 engage positioning tabs 64b and 64c and the tabs guide the top housing around the outer periphery 56 of the bottom housing 42. Bosses 98 and 100 are slid onto locating members 28a and 28b to located the top housing in the position required to load the side seals. Finally, the top housing is loaded down onto the side seals by clamps 150. The prong 153 of each clip is located in a slotted base 97, and the hooked end 154 of each clip is located below a tab 34a, 34b and 32a, 32b. At this time, the lever is located away from the top housing. The lever 152 is then rotated about axis 156, toward the top housing to the position shown in FIG. 3. When the clips are locked in place, the side seals and bottom seals are loaded as required and the desired seal between the bottom seal 70 and sealing boundary is produced.

While I have illustrated and described a preferred embodiment of our invention, it is understood that this is capable of modification, and I therefore do not wish to be limited to the precise details set forth, but desire to avail myself of such changes and alterations as fall within the purview of the following claims.

Having described the invention, what is claimed is:

1. A filter assembly for a fluid compressor, comprising:
   a) a substantially planar first filter housing having an outer periphery, a sealing boundary, a plurality of discrete locator ribs spaced around the sealing boundary each of the locator ribs extending between the sealing boundary and the outer periphery, each locator rib also including first and second ends with filter element positioning tabs and second filter housing positioning tabs included respectively at the first and second rib ends, the first filter housing also including a filtered fluid inlet;
   b) a filter element having a filter media made integral with a first side seal member, a second side seal member, and a bottom seal, the filter element bottom seal seated on the sealing boundary adjacent the filter element positioning tabs;
   c) a second filter housing seated on the filter element, the second filter housing having a filter loading means for loading the side seal members to cause the bottom seal to sealingly engage the sealing boundary the second filter housing located adjacent the filter housing positioning tabs when the second filter housing is seated on the filter element; and
   d) means for maintaining loading on the side seal members.

2. The filter assembly as claimed in claim 1 wherein the sealing boundary is endless, has a sealing surface, and a plurality of sealing ridges along the sealing surface.

3. The filter assembly as claimed in claim 2 wherein each sealing ridge has a semicircular cross section and wherein each ridge is endless.

4. The filter assembly as claimed in claim 1 wherein the second filter housing includes a rear portion, said loading means comprising a front loading means, a rear loading means and side seal loading means joining the front and rear loading means; a fluid inlet provided along the rear portion; and a plurality of scallops provided along the front loading means.

5. The filter assembly as claimed in claim 4 wherein the filter assembly includes a primary fluid passage flow connecting the second filter housing inlet with the scallops formed in the front loading means.

6. The filter assembly as claimed in claim 1 wherein said means for maintaining loading on the side seal members is a plurality of lever clamps.

7. The filter assembly as claimed in claim 1 wherein the filter element is a panel filter.

8. A fluid compressor comprising:
   a) a frame, a compression chamber mounted on the frame, a valve plate mounted on the compression chamber, and a compressor head mounted on the valve plate, said compressor head having an inlet for supplying an uncompressed fluid to the compression chamber; and b) a filter assembly for a fluid compressor, comprising:
  i) a first filter housing seated on the compressor head, the first filter housing having an outer periphery, a sealing boundary, a plurality of discrete locator ribs spaced around the sealing boundary each of the locator ribs extending between the sealing boundary and the outer periphery, each locator rib also including a first and second ends with filter element and second filter housing positioning tabs included respectively at the first and second rib ends, the first filter housing also including a fluid inlet;
  ii) a filter element seated on the sealing boundary, the filter element having a filter media made integral with a first side seal member, a second side seal member, and a bottom seal, the filter bottom seal located adjacent the filter element positioning tabs when the filter element is seated on the sealing boundary;
  iii) a second filter housing seated on the filter element, the second filter housing having a filter loading means for loading the side seal members to cause the bottom seal to sealingly engage the sealing boundary, the second filter housing located adjacent filter housing positioning tabs when the second filter housing is seated on the filter element; and
  iv) means for maintaining loading on the side seal members.

9. The fluid compressor as claimed in claim 8 wherein the compressor is a reciprocating compressor.

10. The filter assembly as claimed in claim 1 wherein the positioning tabs are triangular.

11. The filter assembly as claimed in claim 1 wherein the bottom seal has a first end and a second end, second filter housing includes a first loading member having an edge located on the first end of the bottom seal, a second loading member having an edge located on the second end of the bottom seal, the first loading member having an inlet flow opening.

12. The filter assembly as claimed in claim 11 wherein the inlet flow opening is comprised of a plurality of scallops.

13. The filter assembly as claimed in claim 1 wherein the second filter housing includes a top, a housing inlet end having a fluid inlet, an inlet end loading member, a filter inlet end, and a filter inlet end loading member having a filter inlet, first and second side loading members joining the inlet and filter inlet end loading members, and first and second sides joining the inlet and filter ends; and the filter element bottom seal including an inlet end and a filter inlet end; the filter assembly further including a primary fluid passage flow connecting the second filter housing inlet and the filter inlet, the flow passage having a top, a bottom, an inner portion and an outer portion, the flow passage defined as follows:
  a) along the top by the second filter housing top,
  b) along the bottom by the first filter housing,
  c) along the inner portion at the inlet end by the bottom seal inlet end and the inlet end loading member and along the outer portion of the inlet end by the second filter housing inlet end,
  d) along the inner portion at the filter inlet by the inlet end of the bottom seal and inlet end loading member, and along the outer portion of the inlet end by the second filter housing inlet end,
  e) along the inner portion of the first side by a first side seal member and a first side loading member and along the outer portion of the first side by the first side of the second filter housing, and
  f) along the inner portion of the second side by the second side seal member and a second side loading member and along the outer portion of the second side by a second side of the second filter housing.

14. The filter assembly as claimed in claim 8 wherein the positioning tabs are substantially triangular.

15. The filter assembly as claimed in claim 8 wherein the filter assembly includes a primary fluid passage flow connecting the inlet in the second filter housing with the filter inlet.

* * * * *